(12) United States Patent
Koyama et al.

(10) Patent No.: US 6,668,676 B2
(45) Date of Patent: Dec. 30, 2003

(54) TRANSMISSION

(75) Inventors: Shigeru Koyama, Saitama (JP);
 Shinichi Kojima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/073,046

(22) Filed: Feb. 12, 2002

(65) Prior Publication Data

US 2002/0134187 A1 Sep. 26, 2002

(30) Foreign Application Priority Data

Feb. 13, 2001 (JP) ........................................ 2001-034951

(51) Int. Cl.⁷ ............................................... B60K 20/00
(52) U.S. Cl. .................................. 74/473.28; 74/473.37
(58) Field of Search ........................... 74/473.37, 473.28

(56) References Cited

U.S. PATENT DOCUMENTS 4,275,614 A * 6/1981 Okubo et al. ............ 74/473.28
4,449,416 A * 5/1984 Huitema .................... 74/336 R
6,553,858 B1 * 4/2003 Kim ......................... 74/473.18

FOREIGN PATENT DOCUMENTS

| CA | 2323387 | * | 4/2001 |
| JP | 2001-116141 | | 4/2001 |

* cited by examiner

Primary Examiner—David Fenstermacher
(74) Attorney, Agent, or Firm—Arent Fox Kintner Plotkin & Kahn, PLLC

(57) ABSTRACT

A positioning means for a reverse shifting fork includes a toggle spring for biasing the reverse shifting fork toward one of a reverse position shown by a solid line and a neutral position shown by a dashed line with a dead point set as a boundary between the reverse position and the neutral position, and a stopper pin for stopping the reverse shifting fork in the reverse position and the neutral position against a biasing force of the toggle spring. The toggle spring is a torsional coil spring and is compressed so that a biasing force is generated in a direction to move opposite ends of the spring connected respectively to the reverse shifting fork holder and the reverse shifting fork away from each other, and the distance between the opposite ends is smallest in the dead point.

6 Claims, 10 Drawing Sheets

FIFTH-SPEED / REVERSE SELECTING POSITION

FIRST-SPEED / SECOND-SPEED SELECTING POSITION

THIRD-SPEED / FOURTH-SPEED SELECTING POSITION

REVERSE POSITION

TRANSMISSION

BACKGROUND OF THE INVENTION

1. Field of the Invention

The present invention relates to a transmission including a positioning means for positioning a reverse shifting fork, swingably supported on a reverse shifting fork holder, in a reverse position and neutral position.

2. Description of the Related Art

Such a transmission has been proposed, for example, in Japanese Patent Application No. 11-295418 filed by the present applicant. This transmission includes a fifth-speed/reverse shifting rod capable of being swung to a reverse position and a fifth-speed position through a neutral position set therebetween. The movement of the fifth-speed/reverse shifting rod between the neutral position and the reverse position is transmitted through a cam mechanism to a reverse shifting fork. The fifth-speed/reverse shifting rod is adapted to be appropriately stopped in any of the neutral position, the reverse position and the fifth-speed position by a detent mechanism. The detent mechanism includes a ball biased by a spring and three recesses into each of which the ball can be fitted, and the reverse shifting fork is positioned indirectly in any of the neutral position and the reverse position through the detent mechanism.

However, even if the fifth-speed/reverse shifting rod is positioned by the detent mechanism, since a transmitting member such as a cam mechanism is interposed between the fifth-speed/reverse shifting rod and the reverse shifting fork, an accumulated unevenness in the transmitting path of the transmitting member causes insufficient positioning of the reverse shifting fork. Therefore, the reverse shifting fork has been conventionally positioned directly in any of the neutral position and the reverse position by disposing a second detent mechanism between the reverse shifting fork and a reverse shifting fork holder for swingably supporting the reverse shifting fork.

The conventional second detent mechanism is comprised of a ball held in a retaining bore in the reverse shifting fork holder, two recesses which are defined in the reverse shifting fork and into each of which the ball can be fitted, and a leaf spring mounted on the reverse shifting fork holder for biasing the ball in a direction to fit the ball into each of the recesses in the reverse shifting fork. As such, the conventional second detent mechanism has a complicated structure, resulting in not only an increased weight and cost, but also the generation of a large frictional force between the ball and the reverse shifting fork, and a reduced shift operability.

The present invention has been accomplished with such circumstances in view, and it is an object of the present invention to provide a transmission having a simplified structure with fewer parts in order that a reverse shifting fork can be positioned reliably in any one of a reverse position and a neutral position, providing a smooth shift operability between the reverse position and the neutral position.

SUMMARY OF THE INVENTION

To achieve the above object, there is provided a transmission, comprising a positioning means for positioning a reverse shifting fork swingably supported on a reverse shifting fork holder in a reverse position and a neutral position. The positioning means includes a toggle spring for biasing the reverse shifting fork toward one of the reverse position and the neutral position with a dead point set as a boundary between the reverse position and the neutral position. A first stopper means stops the reverse shifting fork in the reverse position against a biasing force of the toggle spring. A second stopper means stops the reverse shifting fork in the neutral position against the biasing force of the toggle spring.

With the above arrangement, the reverse shifting fork is biased by the toggle spring toward one of the reverse position and the neutral position with the dead point set as the boundary between the reverse position and the neutral position, and the reverse shifting fork biased by the toggle spring is stopped in the reverse position and the neutral position by the first and second stopper means, respectively. Therefore, the structure of the positioning means of the present invention is simplified, leading to a reduction in the weight and cost of the positioning means, over the positioning means of the conventional detent mechanism. Furthermore, the reverse shifting fork of the present invention moved beyond the dead point can be quickly swung into the reverse position or the neutral position by the toggle spring, thereby providing a preferable and appropriate smooth shift operability between the reverse position and the neutral position.

The toggle spring of the present invention comprises a torsional coil spring, which is compressed so that a biasing force is generated in a direction to move opposite ends of the spring connected respectively to the reverse shifting fork holder and the reverse shifting fork away from each other. The distance between the opposite ends of the spring is smallest in the dead point.

With the above arrangement, the toggle spring comprises the torsional coil spring connected at its opposite ends to the reverse shifting fork holder and the reverse shifting fork. As a result, the structure of the positioning means can be greatly simplified.

A torsional coil spring 91 in an embodiment corresponds to the toggle spring of the present invention; a first stopper face 50c and a stopper pin 92 in the embodiment correspond, in cooperation with each other, to the first stopper means of the present invention; and a second stopper face 50d and the stopper pin 92 in the embodiment correspond, in cooperation with each other, to the second stopper means of the present invention.

DESCRIPTION OF PREFERRED EMBODIMENT

The mode for carrying out the present invention will now be described by way of an embodiment of the present invention shown in the accompanying drawings.

Figure 1:
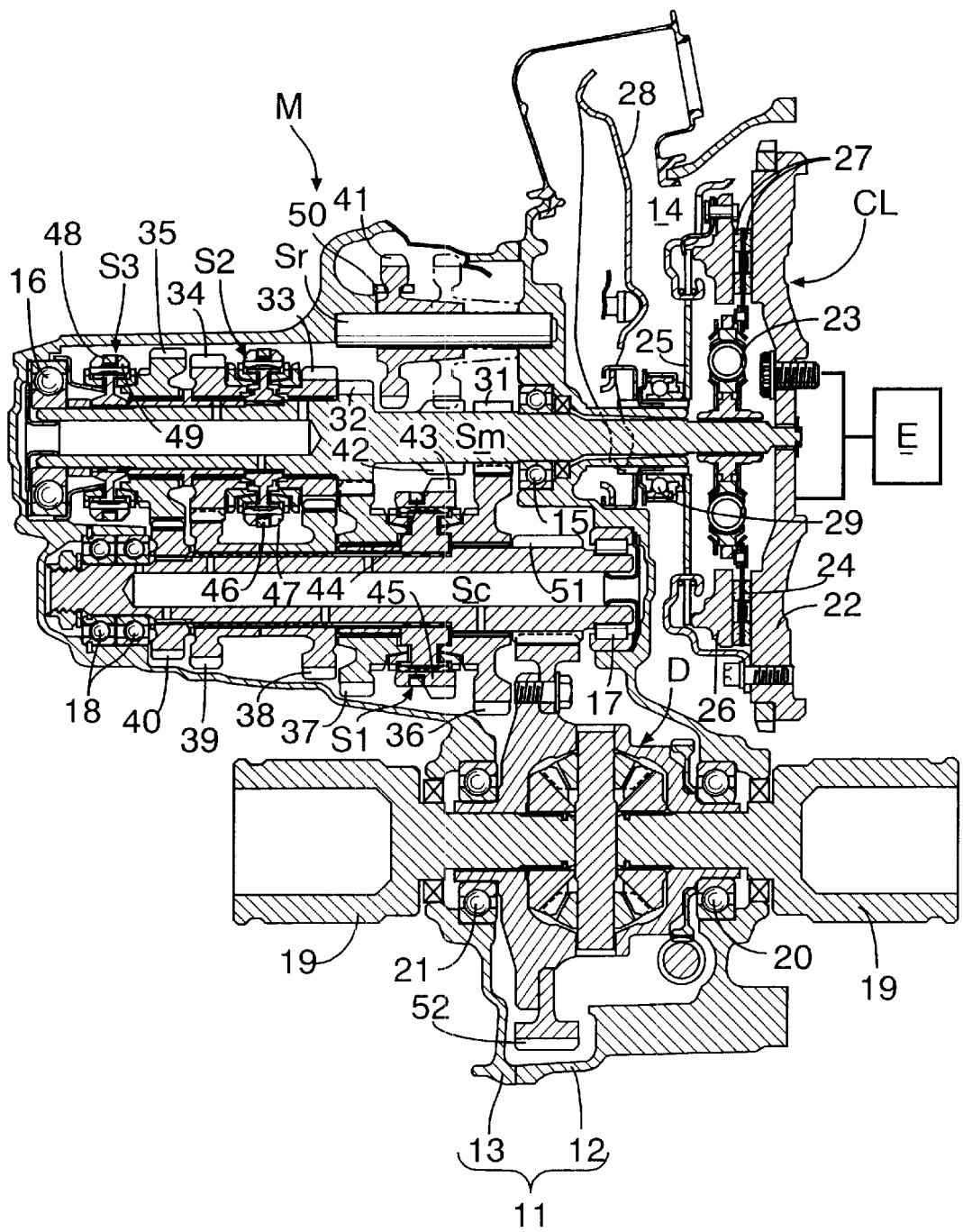
FIG. 1 is a vertical sectional view of a manual transmission for a vehicle.

As shown in FIG. 1, a transmission case 11 of a manual transmission M for a vehicle having five forward speed stages and one backward speed stage comprises a proximal case half 12 and a distal case half 13 separated from each other on a parting plane extending in a longitudinal direction of a vehicle body. A shifting clutch CL is accommodated in a clutch chamber 14 defined on a side of the proximal case half 12 closer to an engine E. The proximal case half 12 and the proximal ends of the components in the manual transmission M are in the direction of or disposed closer to the engine E, while the distal case half 13 and the distal ends of the components in the transmission M are in an opposite direction of or disposed farther from the engine E. A main shaft Sm connected to the engine E through the shifting clutch CL is supported by its proximal and distal opposite ends on the proximal case half 12 and the distal case half 13 with ball bearings 15 and 16 interposed therebetween, respectively. A countershaft Sc disposed in parallel to the main shaft Sm is supported by its opposite ends on the proximal case half 12 and the distal case half 13 with a roller bearing 17 and ball bearings 18, 18 interposed therebetween, respectively. A differential gear D for distributing an output from the countershaft Sc to distal and proximal axles 19, 19 is supported on the proximal case half 12 and the distal case half 13, with a pair of distal and proximal ball bearings 20 and 21 interposed therebetween.

The shifting clutch CL accommodated in the clutch chamber 14 includes a clutch wheel 22 connected to a distal end of a crankshaft of the engine E, and a clutch disk 24 connected to the end of the main shaft through a damper 23. The shifting clutch CL is normally in its engaged state when a facing 27 of the clutch disk 24 is clamped between a pressure plate 26 and the clutch wheel 22 under a repulsing force of a diaphragm spring 25. The shifting clutch CL is released from engagement by urging a release bearing 29 distally by a release fork during shifting.

A main first-speed gear 31 and a main second-speed gear 32 are fixedly mounted on the main shaft Sm. A main third-speed gear 33, a main fourth-speed gear 34 and a main fifth-speed gear 35 are relatively rotatably carried on the main shaft Sm. A counter first-speed gear 36 and a counter second-speed gear 37 mesh with the main first-speed gear 31 and the main second-speed gear 32, respectively, and are relatively rotatably carried on the countershaft Sc. A counter third-speed gear 38, a counter fourth-speed gear 39 and a counter fifth-speed gear 40 are fixedly mounted on the countershaft Sc and mesh with the main third-speed gear 33, the main fourth-speed gear 34 and the main fifth-speed gear 35, respectively.

A reverse idle shaft Sr is supported by its distal and proximal opposite ends on the proximal case half 12 and the distal case half 13. A reverse idle gear 41 is carried on the reverse idle shaft Sr for laterally sliding movement is capable of being meshed with a main reverse gear 42 fixedly mounted on the main shaft Sm, and is capable of being meshed with a counter reverse gear 43 relatively rotatably carried on the countershaft Sc.

The counter first-speed gear 36 is coupled to the countershaft Sc by proximally moving a sleeve 45 of a first-speed/second-speed synchronizing mechanism S1 by a first-speed/second-speed shifting fork 44, thereby establishing a first-speed stage. The counter second-speed gear 37 is coupled to the countershaft Sc by distally moving the sleeve 45 of the first-speed/second-speed synchronizing mechanism S1 by the first-speed/second-speed shifting fork 44, thereby establishing a second speed stage. The main third-speed gear 33 is coupled to the main shaft Sm by moving a sleeve 47 of a third-speed/fourth-speed synchronizing mechanism S2 proximally by a third-speed/fourth-speed shifting fork 44, thereby establishing a third speed stage. The counter fourth-speed gear 34 is coupled to the main shaft Sm by distally moving the sleeve 47 of the third-speed/fourth-speed synchronizing mechanism S2 by the third-speed/fourth-speed shifting fork 44, thereby establishing a fourth speed stage.

The main fifth-speed gear 35 is coupled to the main shaft Sm by proximally moving a sleeve 49 of a fifth-speed synchronizing mechanism S3 by a fifth-speed shifting fork 48, thereby establishing a fifth speed stage. When the sleeve 49 of the fifth-speed synchronizing mechanism S3 is distally moved by the fifth-speed shifting fork 48, a reverse shifting fork 50 retaining the reverse idle gear 41 for rotating movement is proximally moved in association with the movement of the fifth-speed shifting fork 48. As a result, the reverse idle gear 41 meshes with the main reverse gear 42 and the counter reverse gear 43 mounted on the sleeve 45 of the first-speed/second-speed synchronizing mechanism S1, to establish a reverse speed stage.

Each of the first-speed/second-speed synchronizing mechanism S1, the third-speed/fourth-speed synchronizing mechanism S2 and the fifth-speed synchronizing mechanism S3 is well known, and performs a synchronization by a friction force provided between a blocking ring and a synchronizing cone due to the distal or proximal movement of each of the sleeves 45, 47 and 49.

When any of the first to fifth speed stages or the reverse speed stage is established in the above manner, the rotation of the countershaft Sc is transmitted via a final drive gear 51 and a final driven gear 52 to a differential gear D to drive the distal and proximal axles 19, 19.

Figure 2:
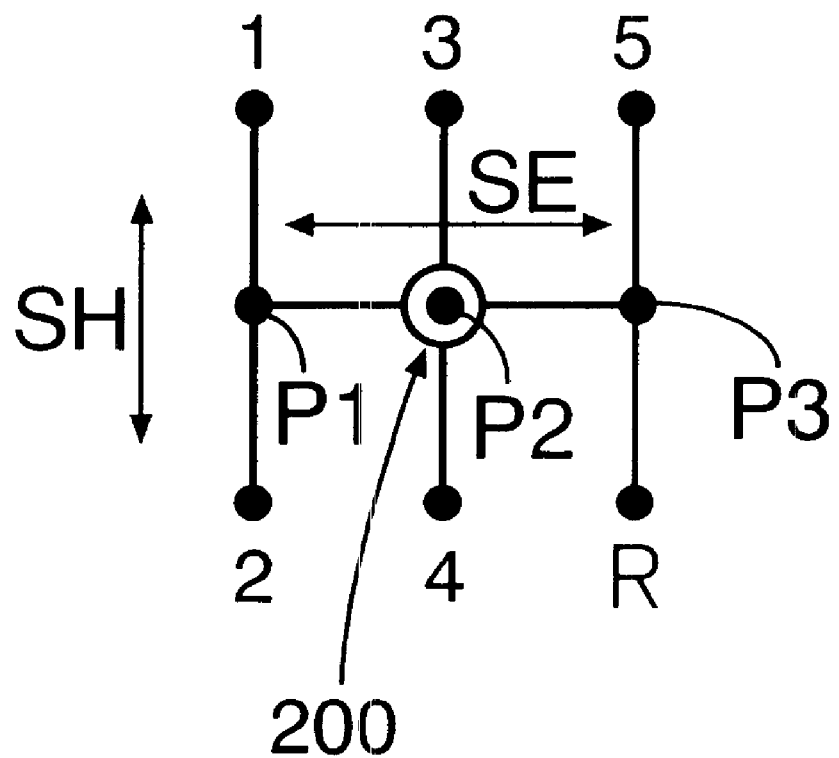
FIG. 2 is a diagram illustrating a change pattern of a change lever.

FIG. 2 shows a pattern of operation of a change lever 200 of a changing device. In FIG. 2, P1 is a first-speed/second-speed selecting position; P2 is a third-speed/fourth-speed selecting position; and P3 is a fifth-speed/reverse selecting position. Positions 1 and 2 on opposite sides of the first-speed/second-speed selecting position P1 are a first-speed position and a second-speed position, respectively. Positions 3 and 4 on opposite sides of the third-speed/fourth-speed selecting position P2 are a third-speed position and a fourth-speed position, respectively. Positions 5 and R on opposite sides of the fifth-speed/reverse selecting position are a fifth-speed position and a reverse position, respectively. In FIG. 2, an arrow SE represents a selecting direction in the operation of the change lever 200, and an arrow SH represents a shifting direction in the operation of the change lever 200.

Figure 3:
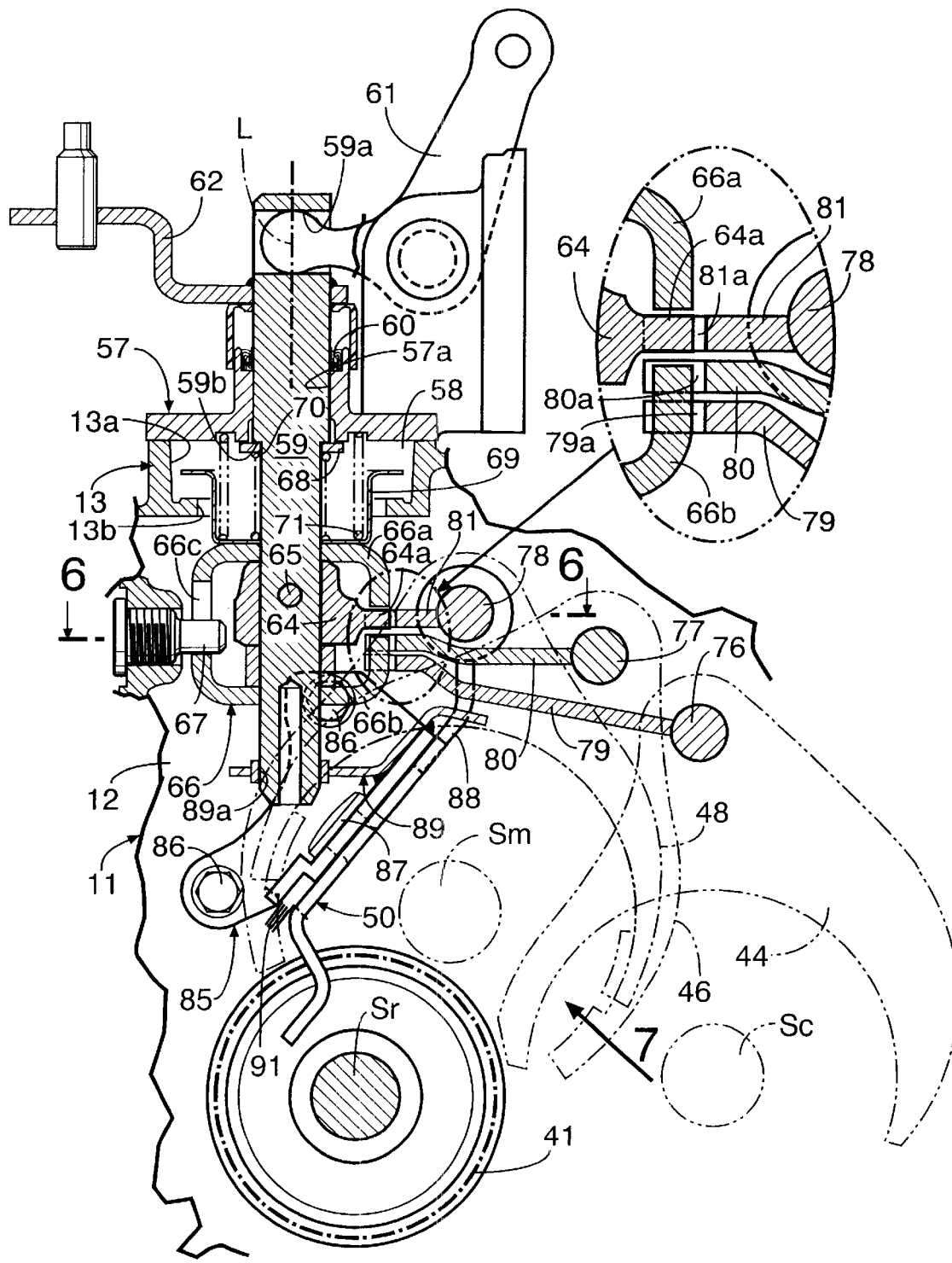
FIG. 3 is an enlarged cross-sectional view of FIG. 1 illustrating a fifth-speed/reverse selecting position.

As shown in FIG. 3, a dish-shaped recess 13a is formed at an upper portion of the distal case half 13 of the transmission case 11. A breather chamber 58 is defined between a cover member 57 and the recess 13a by coupling the cover member 57 by a bolt (not shown) to cover an opening of the recess 13a. A shift selection shaft 59 is supported by its upper portion in a guide bore 57a defined at the central portion of the cover member 57 for rotation about an axis L and for sliding movement in a direction of the axis L.

A notch 59a is formed at an upper end of the shift selection shaft 59 extending from the cover member 57 through a seal member 60 to the outside, and the selecting lever 61 is engaged in the notch 59a. The selecting lever 61 can be swung vertically in association with the selecting operation (the operation in the direction of the arrow SE in FIG. 2) of the change lever 200 to move the shift selection shaft 59 among the third-speed/fourth-speed selecting position shown in FIG. 5, the fifth-speed/reverse selecting position (see FIG. 3) displaced upwards from the third-speed/fourth-speed selecting position, and the first-speed/second-speed selecting portion (see FIG. 4) displaced downwards from the third-speed/fourth-speed selecting position.

A shifting lever 62 is fixed below the notch 59a of the shift selection shaft 59 and adapted to be rotated distally and proximally in association with the shifting operation (the operation in the direction of the arrow SH in FIG. 2) of the change lever 200. When the change lever 200 is in the first-speed/second-speed selecting portion P1, the third-speed/fourth-speed selecting position P2 or the fifth-speed/reverse selecting position P3, the shift selection shaft 59 is in the neutral position. When the change lever 200 is operated to the first-speed position 1, the third-speed position 3 or the fifth-speed position 5, the shift selection shaft 59 is rotated in one direction from the neutral position. When the change lever 200 is operated to the second-speed position 2, the fourth-speed position 4 or the reverse position R, the shift selection shaft 59 is rotated in the other direction from the neutral position. The shift selection shaft 59 is capable of being appropriately stopped in any of the three rotated positions by a detent mechanism 63 (see FIG. 6).

A shifting arm 64 is fixed to the shift selection shaft 59 extending into the distal case half 13 by a fixing pin 65, and an interlocking plate 66 is relatively rotatably supported to sandwich the shifting arm 64 from above and below. The interlocking plate 66 has a pair of upper and lower locking claws 66a and 66b, which face upper and lower surfaces of a drive portion 64a formed at a tip end of the shifting arm 64. The interlocking plate 66 also has a guide groove 66c extending in parallel to the shift selection shaft 59, and a detent pin 67 fixed to the distal case half 13 is engaged in the guide groove 66c.

Therefore, when the shift selection shaft 59 is moved upwards or downwards, the shifting arm 64 and the interlocking plate 66 are lifted or lowered in unison with each other, but when the shift selection shaft 59 is rotated, the shifting arm 64 is rotated in unison with the shift selection shaft 59, while the rotation of the interlocking plate 66 is restricted by the engagement of the detent pin 67 in the guide groove 66c.

The shift selection shaft 59 has a lower half of a smaller diameter provided below a step-shaped stopper face 59b formed substantially centrally in a direction along the axis L, and an upper surface of a first spring seat 68 slidably fitted over the smaller-diameter lower half is put into abutment against the stopper face 58b from below. A hut-shaped second spring seat 69 is slidably fitted over a smaller-diameter portion of the shift selection shaft 59 below the first spring seat 68. A first spring 70 is mounted under compression between a lower surface of the first spring seat 68 and an upper surface of the second spring seat 69. Further, a second spring 71 is mounted under compression between the upper surface of the second spring seat 69 and a lower surface of the cover member 57.

Figure 5:
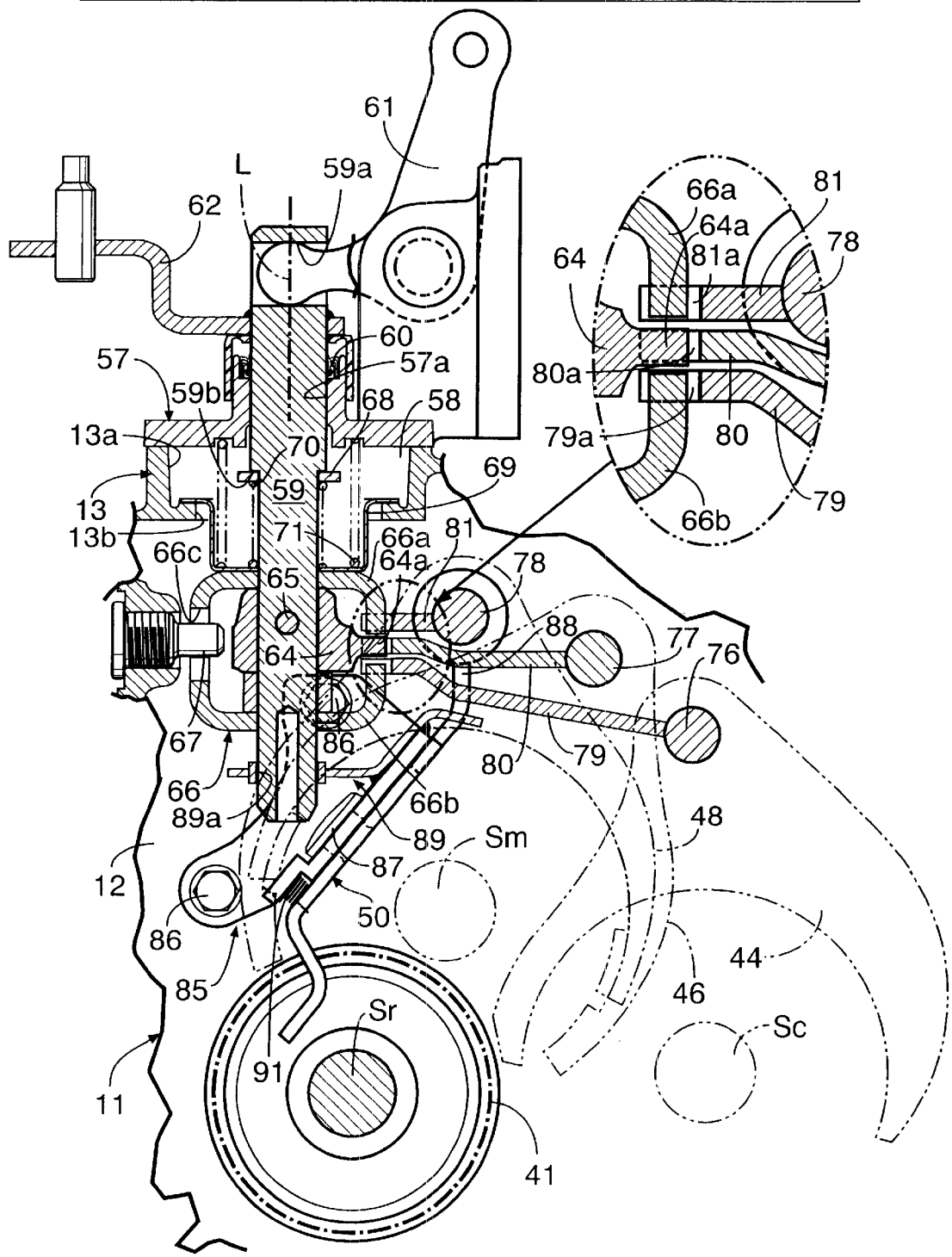
FIG. 5 is an enlarged cross-sectional view of FIG. 1 illustrating a third-speed/fourth-speed selecting position.

When the shift selection shaft 59 is in the third-speed/fourth-speed selecting position shown in FIG. 5, the second spring seat 69 biased downwards by the second spring 71 is stopped at a location where its outer peripheral flange abuts against an upper surface of the opening 13b in the distal case half 13, and the shift selection shaft 59 is biased upwards by a biasing force of the first spring 70 and stopped with the shifting arm 64 abutting against a lower surface of the upper locking claw 66a of the interlocking plate 66.

When the shift selection shaft 59 is moved upwards from the third-speed/fourth-speed selecting portion toward the fifth-speed/reverse selecting position (see FIG. 3) the second spring 71 is compressed, generating a downward biasing force for returning the shift selection shaft 59 to the third-speed/fourth-speed selecting portion. This causes the second spring seat 69 to be pushed upwards by the upper surface of the interlocking plate 66, thereby permitting the inside of the transmission case 11 to communicate with the breather chamber 58 through the opening 13b. Conversely, when the shift selection shaft 59 is moved downwards from the third-speed/fourth-speed selecting position toward the first-speed/second-speed selecting position (see FIG. 4) the first spring 70 is compressed, generating an upward biasing force for returning the shift selection shaft 59 to the third-speed/fourth-speed selecting position.

Figure 6:
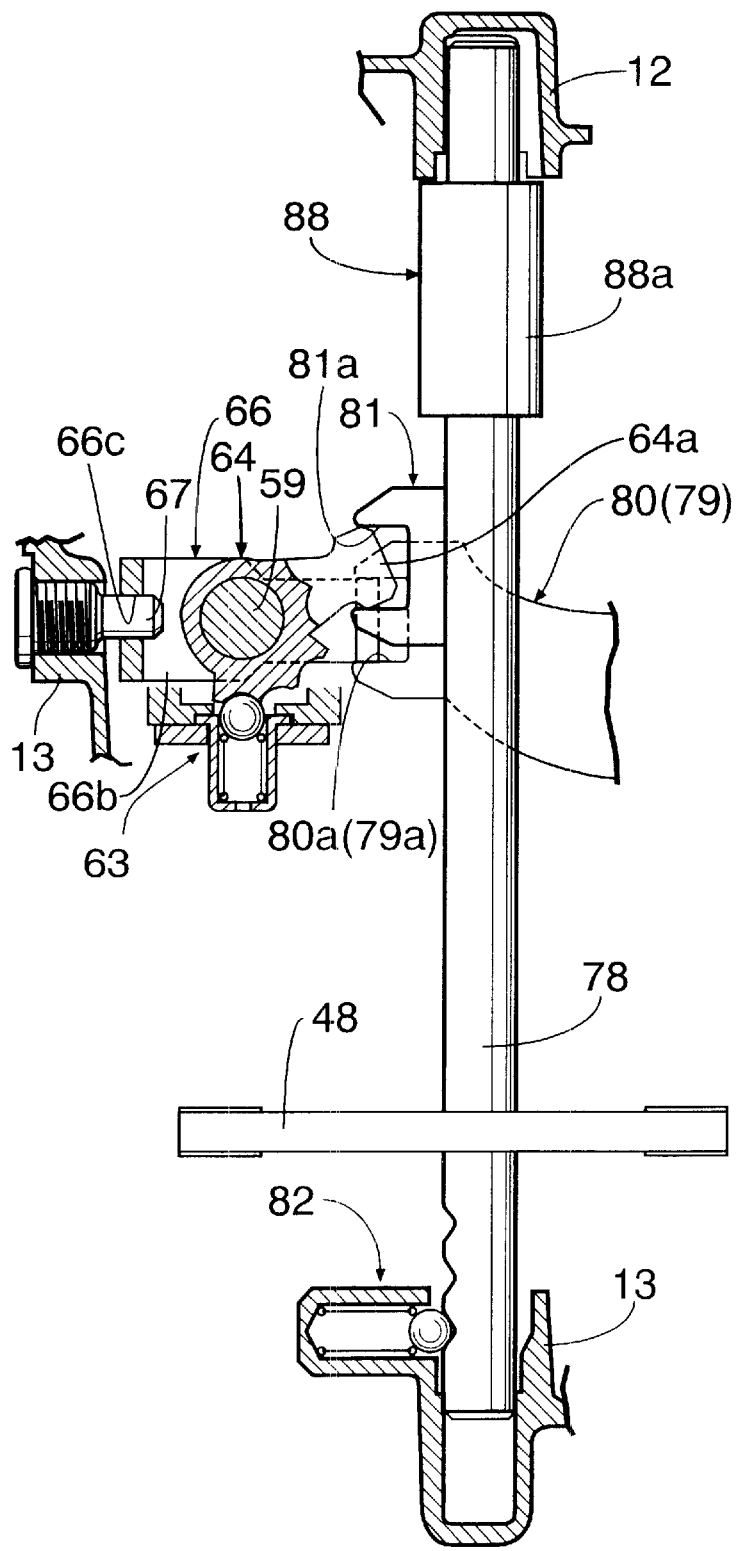
FIG. 6 is a sectional view taken along a line 6—6 in FIG. 3 illustrating a reverse position.
Figure 7:
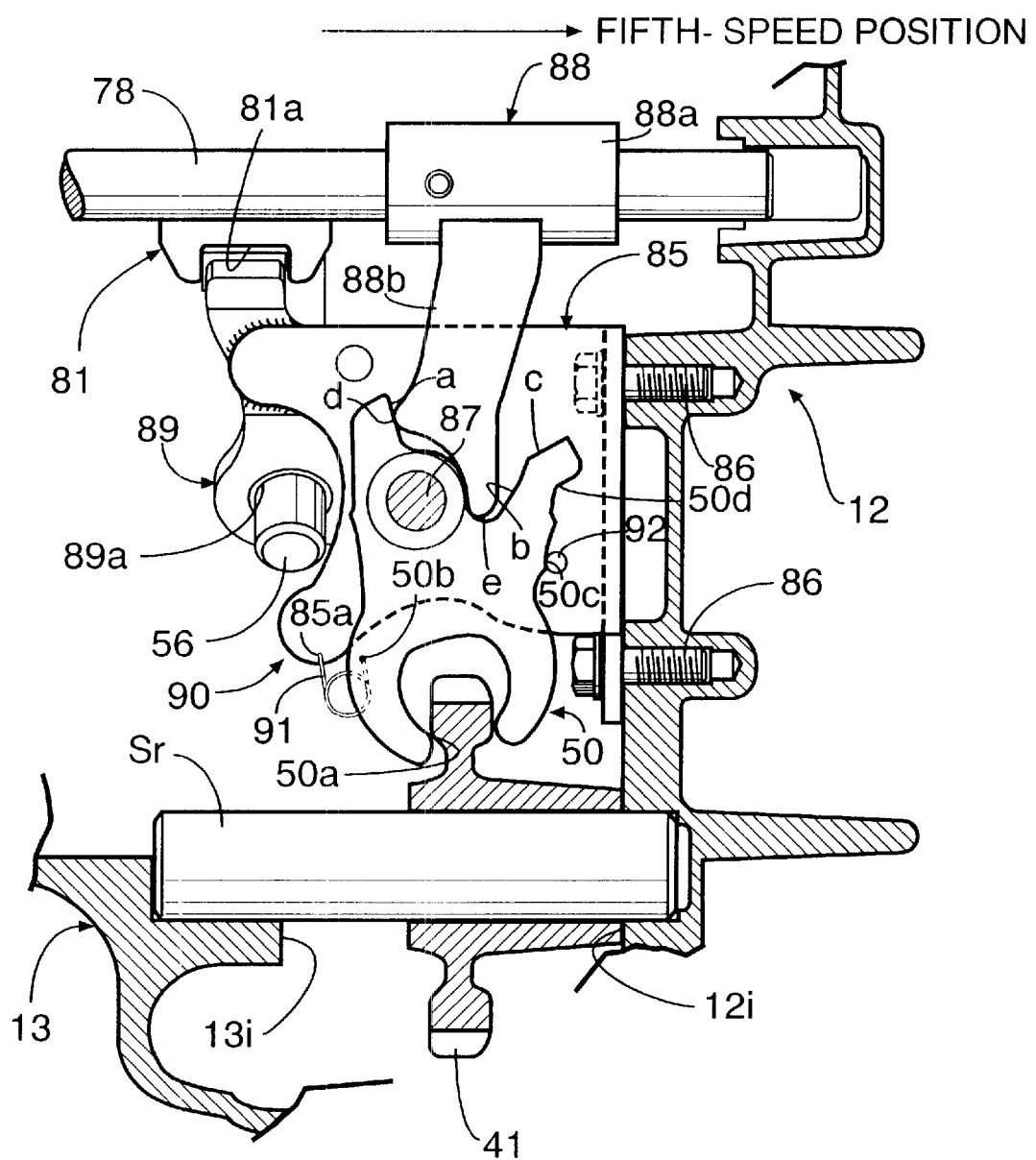
FIG. 7 is a view in an arrow 7 FIG. 3 illustrating a reverse shifting fork in a reverse position.

As shown in FIGS. 3, 6 and 7, a fifth-speed/reverse shifting rod 78 including a fifth-speed shifting fork 48 is slidably supported by its opposite ends on the proximal case half 12 and the distal case half 13, respectively. Likewise, a first-speed/second-speed shifting rod 76 including the first-speed/second-speed shifting fork 44 and a third-speed/fourth-speed shifting rod 77 including the third-speed/fourth-speed shifting fork 46 are slidably supported by their opposite ends on the proximal case half 12 and the distal case half 13, respectively. A first-speed/second-speed shifting piece 79, a third-speed/fourth-speed shifting piece 80 and a fifth-speed/reverse shifting piece 81 are fixed to the first-speed/second-speed shifting rod 76, the third-speed/fourth-speed shifting rod 77 and the fifth-speed/reverse shifting rod 78, respectively. Notches 79a, 80a and 81a are formed at tip ends of the three shifting pieces 79, 80 and 81 and arranged vertically in line, so that the drive portion 64a provided at the tip end of the shifting arm 64 is selectively brought into engagement with any of the notches 79a, 80a and 81a.

Thus, when the shift selection shaft 59 is in the third-speed/fourth-speed selecting position shown in FIG. 5, the drive portion 64a of the shifting arm 64 is brought into engagement with the notch 80a of the third-speed/fourth-speed shifting piece 80. Hence, the third-speed/fourth-speed shifting rod 77 can be driven along with the third-speed/fourth-speed shifting piece 80 from the neutral position to the third-speed position or the fourth-speed position by the rotation of the shift selection shaft 59. At this time, the unintended operation of the first-speed/second-speed shifting piece 79 and the fifth-speed/reverse shifting piece 81 can be prevented by the engagement of the lower locking claw 66b of the interlocking plate 66 with the notch 79a of the first-speed/second-speed shifting piece 79 and the engagement of the upper locking claw 66a of the interlocking plate 66 with the notch 81a of the fifth-speed/reverse shifting piece 81.

Figure 4:
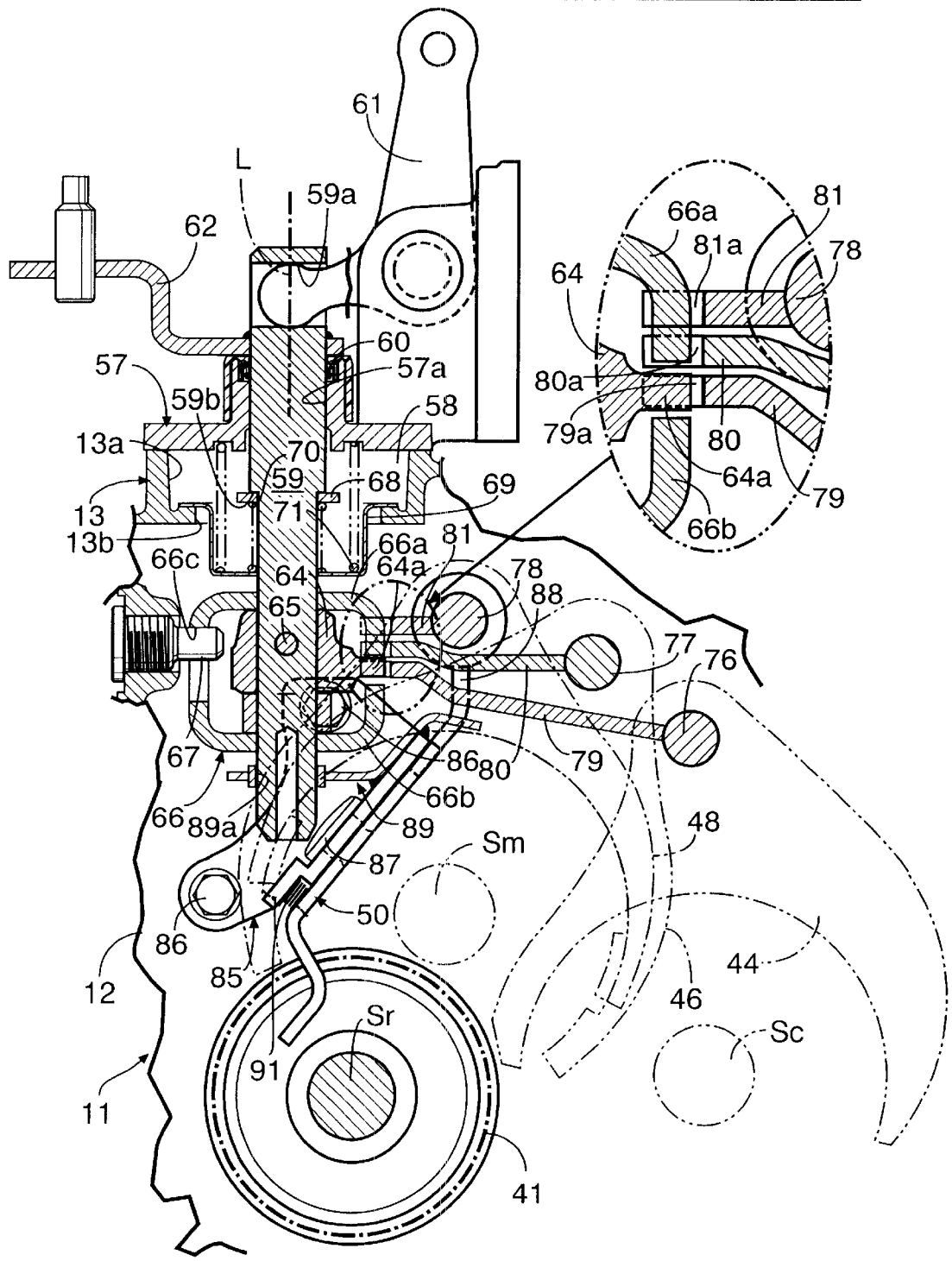
FIG. 4 is an enlarged cross-sectional view of FIG. 1 illustrating a first-speed/second-speed selecting position.

When the shift selection shaft 59 is moved to the first-speed/second-speed selecting position below the third-speed/fourth-speed selecting position, as shown in FIG. 4, the drive portion 64a of the shifting arm 64 is brought into engagement with the notch 79a of the first-speed/second-speed shifting piece 79. Hence, the first-speed/second-speed shifting rod 76 can be driven along with the first-speed/second-speed shifting piece 79 from the neutral position to the first-speed position or the second-speed position by the rotation of the shift selection shaft 59. At this time, the unintended operation of the fifth-speed/reverse shifting piece 81 and the third-speed/fourth-speed shifting piece 80 can be prevented by the engagement of the upper locking claw 66a of the interlocking plate 66 with the notch 81a of the fifth-speed/reverse shifting piece 81 and the notch 80a of the third-speed/fourth-speed shifting piece 80.

When the shift selection shaft 59 is moved to the fifth-speed/reverse selecting position above the third-speed/fourth-speed selecting position, as shown in FIG. 3, the drive portion 64a of the shifting arm 64 is brought into engagement with the notch 81a of the fifth-speed/reverse shifting piece 81. Hence, the fifth-speed/reverse shifting rod 78 can be driven along with the fifth-speed/reverse shifting piece 81 from the neutral position to the fifth-speed position or the reverse position by the rotation of the shift selection shaft 59. At this time, the unintended operation of the first-speed/second-speed shifting piece 79 and the third-speed/fourth-speed shifting piece 80 can be prevented by the engagement of the lower locking claw 66b of the interlocking plate 66 with the notch 79a of the first-speed/second-speed shifting piece 79 and the notch 80a of the third-speed/fourth-speed shifting piece 80.

As shown in FIG. 6, a detent mechanism 82 is mounted in order to appropriately stop the fifth-speed/reverse shifting rod 78 when the rod is driven in correspondence to any one of the fifth-speed/reverse selecting position, the fifth-speed position and the reverse position. In addition, a detent mechanism (not shown) is mounted in order to appropriately stop the first-speed/second-speed shifting rod 76 when the rod is driven in correspondence with any one of the first-speed/second-speed selecting position, the first-speed position and the second-speed position. A detent mechanism (not shown) is also mounted in order to appropriately stop the third-speed/fourth-speed shifting rod 77 when the rod is driven in correspondence with any one of the third-speed/fourth-speed selecting position, the third-speed position and the fourth-speed position.

Figure 10:
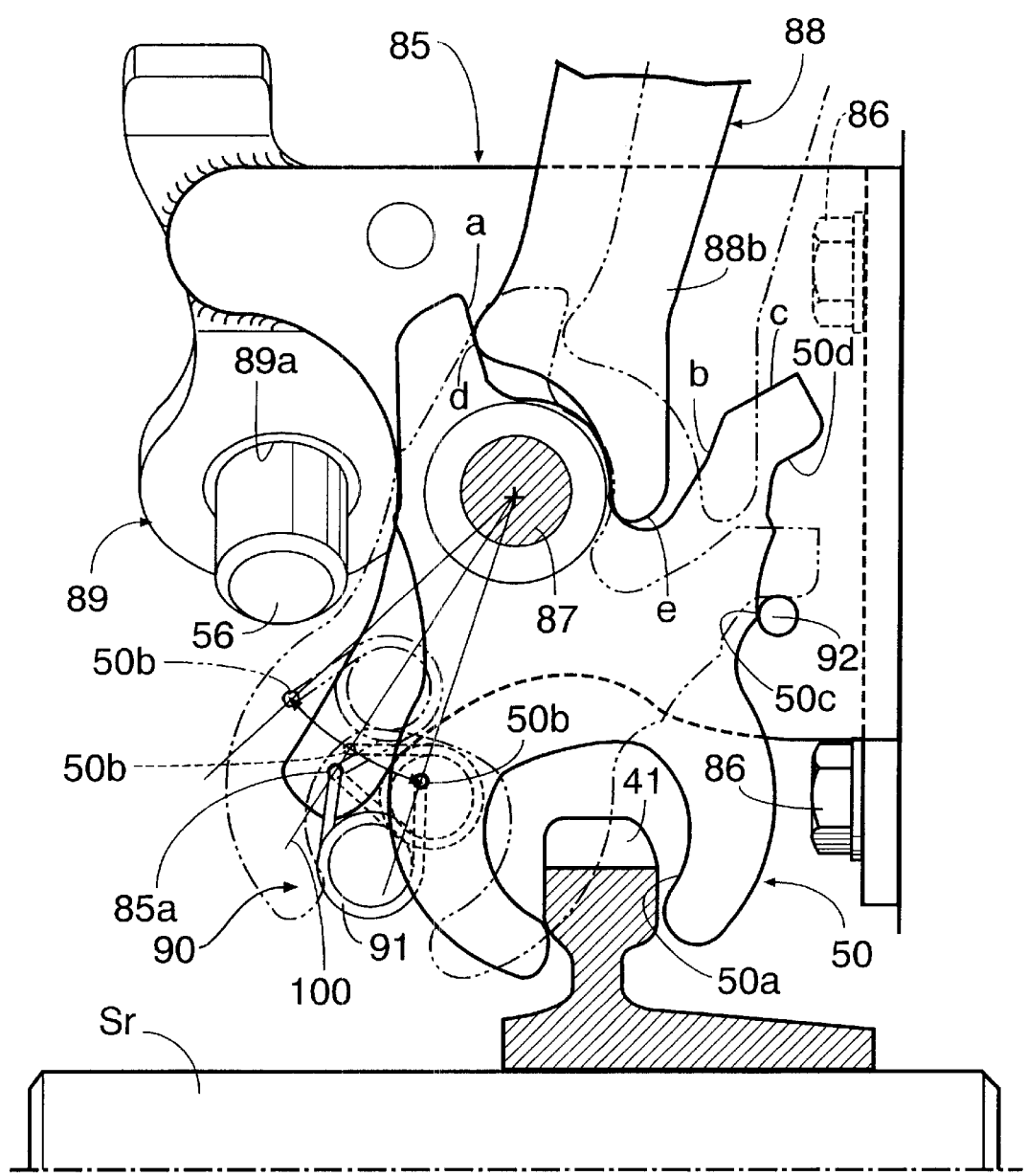
FIG. 10 is a view illustrating the operation of the positioning means.

As shown in FIGS. 3, 7 and 10, a reverse shifting fork holder 85 is fixed to an inner surface of the proximal case half 12 by two bolts 86, 86, and the reverse shifting fork 50 is swingably supported on the reverse shifting fork holder 85 through a pivot pin 87. A notch 50a is formed at one end of the reverse shifting fork 50 for sandwiching opposite sides of the reverse idle gear 41, and a reverse shifting follower cam face a, a neutral-restoring follower cam face b and a neutral-maintaining follower cam face c are formed continuously at the other end of the reverse shifting fork 50, with the pivot pin 87 between them. Also, a reverse shifting drive cam face d capable of abutting against the reverse shifting follower cam face a and a neutral-restoring drive cam face e capable of abutting against the neutral-restoring follower cam face b and the neutral-maintaining follower cam face c are formed continuously at a tip end of a drive cam portion 88b of a cam member 88 having a boss portion 88a fixed to the fifth-speed/reverse shifting rod 78.

A bracket 89 is welded to the reverse shifting fork holder 85 supporting the reverse shifting fork 50, and the shift selection shaft 59 is slidably and rotatably supported by its lower portion in a guide bore 89a extending through the bracket 89. Therefore, the shift selection shaft 59 is supported by its upper portion in the guide bore 57a in the cover member 57 for the breather chamber 58 and at its lower portion in the guide bore 89a in the bracket 89. As a result, a support portion for supporting the lower portion of the shift selection shaft 59 need not be formed on the casing 11. This contributes to the simplification of the casing 11 and to a reduction in the weight of the casing 11.

A positioning means 90 for stopping the reverse shifting fork 50 stably in any one of the reverse position and the neutral position, includes a torsional coil spring 91 and a stopper pin 92. Opposite ends of the torsional coil spring 91 are biased in direction away from each other and locked in a mounting bore 85a in the reverse shifting fork 85 and a mounting bore 50b in the reverse shifting fork 50. The reverse shifting fork 50 includes a first stopper face 50c and a second stopper face 50d, which are capable of being put into abutment against a stopper pin 92 fixed to the reverse shifting fork 85.

Figure 8:
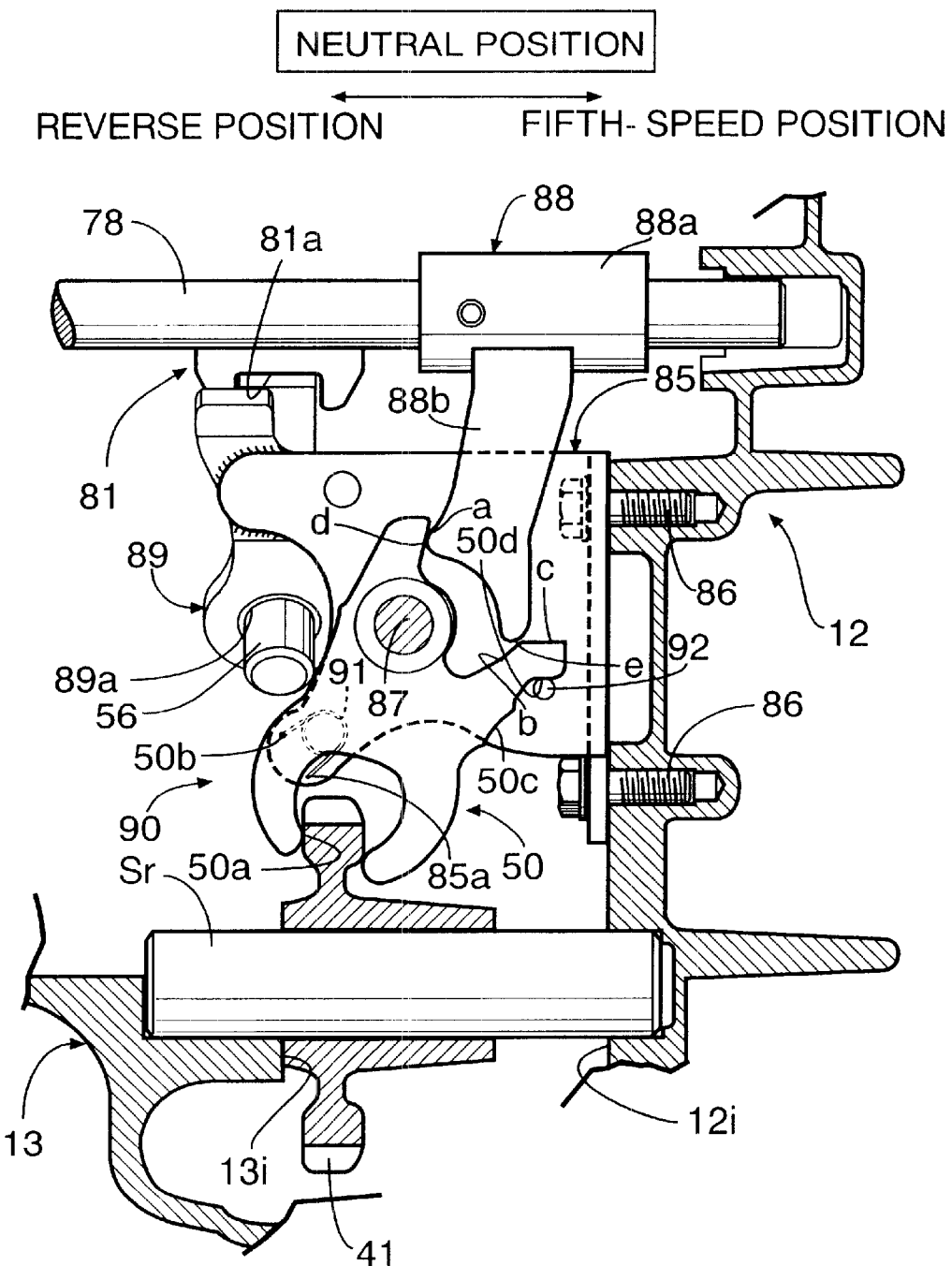
FIG. 8 is a similar view of the positioning means in FIG. 7, illustrating the reverse shifting fork in a neutral position.

Thus, when the fifth-speed/reverse shifting rod 78 is in the neutral position, as shown in FIG. 8, the reverse shifting drive cam face d and the neutral-restoring drive cam face e of the drive cam portion 88b of the cam member 88 are in abutment against the reverse shifting follower cam face a and the neutral-maintaining follower cam face c of the reverse shifting fork 50, and the reverse idle gear 41 is in the neutral position at a distal end on the reverse idle shaft Sr and is in abutment against an end face 13i of the distal case half 13. Therefore, even if the reverse idle gear 41 is intended to be moved proximally away from the end face 13i of the distal case half 13, the proximal movement of the reverse idle gear 41 is inhibited by the abutment of the neutral-restoring drive cam face e of the drive cam portion 88b and the neutral-maintaining follower cam face c of the reverse shifting fork 50 against each other.

Figure 9:
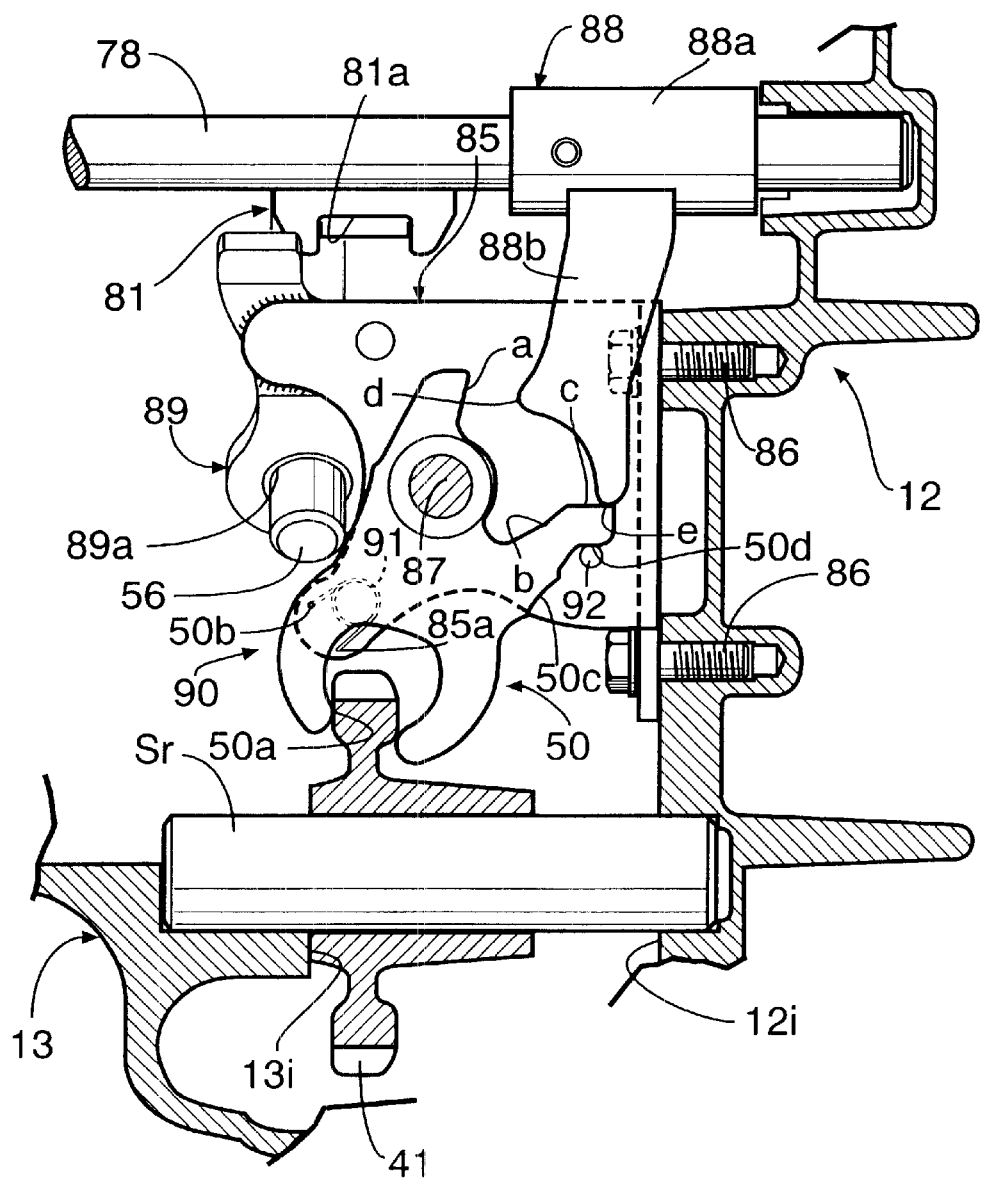
FIG. 9 is a similar view of the positioning means in FIG. 7, illustrating the reverse shifting fork in a fifth-speed position.

When the fifth-speed/reverse shifting rod 78 is moved proximally from the neutral position toward the fifth-speed position to establish the fifth-speed stage, as shown in FIG. 9, the main fifth-speed gear 35 is coupled to the main shaft Sm by the fifth-speed shifting fork 48 mounted on the fifth-speed/reverse shifting rod 78 to establish the fifth-speed stage (see FIG. 1). At this time, the neutral-restoring drive cam face e of the drive portion 88b operated in unison with the fifth-speed reverse shifting rod 78 is slid along the neutral-maintaining follower cam face c of the reverse shifting fork 50, and the reverse shifting fork 50 remains stopped in the neutral position. In this case, even if the reverse idle gear 41 is intended to be moved proximally from the end face 13i of the distal case half 13, the proximal movement of the reverse idle gear 41 is inhibited by the abutment of the neutral-restoring drive cam face e of the drive cam portion 88b and the neutral-maintaining follower cam face c of the reverse shifting fork 50 against each other.

Even if the fifth-speed/reverse shifting rod 78 is moved distally from the fifth-speed position (see FIG. 9) toward the neutral position (see FIG. 8) to cancel the establishment of the fifth-speed stage, the reverse shifting fork 50 remains stopped in the neutral position, because the neutral-restoring drive cam face e of the drive cam portion 88b is slid along the neutral-maintaining follower cam face c of the reverse shifting fork 50.

When the fifth-speed/reverse shifting rod 78 is moved distally from the neutral position to the reverse position to establish the reverse gear stage, the fifth-speed shifting fork 48 mounted on the fifth-speed/reverse shifting rod 78 is also moved distally (see FIG. 1). Simultaneously, the reverse shifting drive cam face d of the drive cam portion 88b operated in unison with the fifth-speed/reverse shifting rod 78 urges the reverse shifting follower cam face a of the reverse shifting fork 50 to swing the reverse shifting fork 50 in a distally counterclockwise direction. As a result, the reverse shifting fork 50 causes the reverse idle gear 41 to be slid proximally along the reverse idle shaft Sr and to mesh with the main reverse gear 42 and the counter reverse gear 43, thereby establishing the reverse gear stage.

In this state, a proximal end face of the reverse idle gear 41 is in abutment against the end face 12i of the proximal case half 12, and even if the reverse idle gear 41 is intended to be moved distally therefrom, the distal movement of the reverse idle gear 41 is inhibited by the abutment of the reverse shifting drive cam face d of the drive cam portion 88b and the reverse shifting follower cam face a of the reverse shifting fork 50 against each other.

When the fifth-speed shifting rod 78 is moved proximally from the reverse position (see FIG. 7) toward the neutral position (see FIG. 8) to cancel the establishment of the reverse gear stage, the neutral-restoring drive cam face e of the drive cam portion 88b urges the neutral-restoring follower cam face b of the reverse shifting fork 50 and hence, the reverse shifting fork 50 is swung in a proximally clockwise direction. As a result, the reverse shifting fork 50 causes the reverse idle gear 41 to be slid distally along the reverse idle shaft Sr away from the main reverse gear 42 and the counter reverse gear 43, to cancel the establishment of the reverse gear stage.

When the reverse shifting fork 50 is in the reverse position, as shown by a solid line in FIG. 10, the reverse shifting fork 50 is biased in the distally counterclockwise direction about the pivot pin 87 by the torsional coil spring 91 and is positioned stably in the reverse position where the first stopper face 50c thereof abuts against the stopper pin 92. When the reverse shifting fork 50 is in the neutral position, as shown by a dashed line in FIG. 10, the reverse shifting fork 50 is biased in the proximally clockwise direction about the pivot pin 87 by the torsional coil spring 91 disposed between the reverse shifting fork 50 and the reverse shifting fork holder 85 and positioned stably in the neutral position where the second stopper face 50d thereof abuts against the stopper pin 92.

A dead point 100, shown by a dashed line, exists in the torsional coil spring 91 between the reverse position shown by the solid line and the neutral position shown by the dashed line. In the dead point 100, the opposite ends of the torsional coil spring 91 are closest to each other. Accordingly, the biasing force in an opening direction is largest, but a rotating moment cannot be applied to the reverse shifting fork 50, because the opposite ends of the torsional coil spring 91 are arranged on a line passing through the pivot pin 87. When the reverse shifting fork 50 is rotated slightly from the dead point 100 in the distally counterclockwise direction, it is rotated at a stroke to the reverse position by the biasing force of the torsional coil spring 91, until the first stopper face 50c thereof abuts against the stopper pin 92. Conversely, when the reverse shifting fork 50 is rotated slightly from the dead point 100 in the proximally clockwise direction, it is rotated at a stroke to the neutral position by the biasing force of the torsional coil spring 91, until the second stopper face 50d thereof abuts against the stopper pin 92.

The positioning means 90 includes a toggle mechanism using the torsional coil spring 91, as described above, allowing the positioning means of the present invention to have a more simplified structure than the positioning means using a conventional detent mechanism. This simplified structure contributes to a reduction in weight and cost. Moreover, when the reverse shifting fork 50 is swung, a load accumulated up to the dead point 100, when the reverse shifting fork 50 reaches the dead point 100, is released at a stroke at the dead point 100. Therefore, the reverse shifting fork 50 can be quickly swung into the reverse position or the neutral position, thereby providing a preferred and appropriate smooth shift operability.

Although the embodiment of the present invention has been described, various modifications may be made without departing from the subject matter of the present invention.

For example, the manual transmission M has been illustrated in the embodiment, but the present invention is applicable to an automatic transmission where the shifting and selecting operations are conducted by an actuator. Although the torsional coil spring 91 is used in the toggle mechanism of the positioning means 90 in the embodiment, any other type of a spring may be used.

As discussed above, the reverse shifting fork is biased toward one of the reverse position and the neutral position with the dead point set as the boundary between the reverse position and the neutral position by the toggle spring. The reverse shifting fork, biased by the toggle spring, is stopped in the reverse position and the neutral position by the first and second stopper means, respectively. Therefore, the structure of the positioning means is more simplified than the positioning means having the conventional detent mechanism. The structure of the positioning means of the present invention not only leads to reductions in weight and cost, but also the reverse shifting fork moved beyond the dead point can be quickly swung to the reverse position or the neutral position by the toggle spring, thereby providing a preferred and appropriate shift operability between the reverse position and the neutral position.

In addition, the toggle spring of the present invention is a torsional coil spring connected at its opposite ends to the reverse shifting fork holder and the reverse shifting fork. Hence, the structure of the positioning means can be greatly simplified.

What is claimed in:

1. A transmission comprising a reverse shifting fork, a reverse shifting fork holder and a positioning means for positioning the reverse shifting fork swingably supported on the reverse shifting fork holder in a reverse position and a neutral position, wherein the positioning means includes a toggle spring for biasing the reverse shifting fork toward one of the reverse position and the neutral position with a dead point set as a boundary between the reverse position and the neutral position, a first stopper means for stopping the reverse shifting fork in the reverse position against a biasing force of the toggle spring, and a second stopper means for stopping the reverse shifting fork in the neutral position against the biasing force of the toggle spring.

2. A transmission according to claim 1, wherein the toggle spring is a torsional coil spring, which is compressed so that the biasing force is generated in a direction to move opposite ends of the spring, connected respectively to the reverse shifting fork holder and the reverse shifting fork, away from each other, and the distance between the opposite ends is smallest in the dead point.

3. A transmission according to claim 1, wherein the first stopper means is an abutment of a first stopper face of the reverse shifting fork and a stopper pin and the second stopper means is an abutment of a second stopper face of the reverse shifting fork and the stopper pin.

4. A transmission according to claim 3, wherein when the reverse shifting fork is rotated in one direction, from the dead point, the reverse shifting fork is rotated at a stroke to the reverse position by the biasing force of the toggle spring, until the first stopper face abuts against the stopper pin.

5. A transmission according to claim 4, wherein when the reverse shifting fork is rotated in another direction, from the dead point, the reverse shifting fork is rotated at a stroke to the neutral position by the biasing force of the toggle spring, until the second stopper face abuts against the stopper pin.

6. A transmission according to claim 1, wherein on a side of said dead point closer to the reverse position, said toggle spring urges said reverse shifting fork toward the reverse position while on a side of said dead point closer to the neutral position, said toggle spring urges said reverse shifting fork toward the neutral position.

* * * * *